US008754152B2

(12) United States Patent
Alsewailem

(10) Patent No.: US 8,754,152 B2
(45) Date of Patent: Jun. 17, 2014

(54) EFFICIENT POLYMER COMPOSITES BASED ON NATURAL WOOL

(75) Inventor: Fares D. Alsewailem, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 223 days.

(21) Appl. No.: 13/278,741

(22) Filed: Oct. 21, 2011

(65) Prior Publication Data

US 2013/0102706 A1 Apr. 25, 2013

(51) Int. Cl.
*C08K 7/02* (2006.01)

(52) U.S. Cl.
USPC .......................................................... 524/12

(58) Field of Classification Search
None
See application file for complete search history.

(56) References Cited

U.S. PATENT DOCUMENTS 4,011,130 A * 3/1977 Worden ........................ 162/151
7,294,673 B2 11/2007 Kanazawa

FOREIGN PATENT DOCUMENTS

| CA | 2224714 A1 * | 1/1997 |
| EA | 000565 B1 | 12/1999 |

OTHER PUBLICATIONS

Blicblau et al., "Novel composites utilizing raw wool and polyester resin," J. Mater. Sci. Lett. 16, 1417-1419 (1997).*
Saxena et al., "Composite Materials from Natural Resources: Recent Trends and Future Potentials," Advances in Composite Materials—Analysis of Natural and Man-Made Materials, P. Tesinova (ed.) (2011).*
Lupton, "Standard Deviation of Fiber Diameter and Other Characteristics of United States Wool," Sheep and Goat Research Journal, vol. 11, No. 3, p. 111-121 (1995).*
English Translation of CN 1102193 Abstract.*

* cited by examiner

*Primary Examiner* — Ling Choi
*Assistant Examiner* — Catherine S Branch
(74) *Attorney, Agent, or Firm* — Andrew M. Calderon; Roberts Mlotkowski Safran & Cole, P.C.

(57) ABSTRACT

A reinforced polymer composite, and more particularly, a wool reinforced polymer composite is provided. The composition includes wool fibers combined with a polymer to form a reinforced polymeric matrix having at least one of improved Izod Impact Strength (ASTM D-256) or improved Tensile Strength (ASTM D-1708) as compared to the polymer without the fibers.

8 Claims, 4 Drawing Sheets

EFFICIENT POLYMER COMPOSITES BASED ON NATURAL WOOL

FIELD OF THE INVENTION

The invention relates to a reinforced polymer composite, and more particularly, to a wool reinforced polymer composite.

BACKGROUND OF THE INVENTION

Fiber reinforced polymer composites (FRPC) are class of engineering materials which are extensively suited for advanced applications such as automotive, civil infrastructure, and military applications. Conventional fibers used to reinforce polymer matrices, such as carbon or glass fibers, are expensive and in some instances their preparation or use may be harmful to the environment. In addition, formulation of FRPC using such fibers requires state of art equipment and advanced methods for fiber preparation and coupling, to ensure good bonding of the fibrous materials to the polymer matrix.

It would be advantageous if less expensive and less environmentally problematic reinforcing materials could be found to enhance the mechanical strength of polymeric matrices.

SUMMARY OF THE INVENTION

In a first aspect of the invention, a composition comprises wool fibers combined with a polymer to form a reinforced polymeric matrix having at least one of improved Izod Impact Strength (ASTM D-256) or improved Tensile Strength (ASTM D-1708) as compared to the polymer without the fibers.

In another aspect of the invention processes of preparing a reinforced polymer composite is provided, by solution casting, solution blending, or melt blending a mixture of wool fibers and a polymer.

In another aspect of the invention, an article of manufacture is provided which comprises a reinforced polymer composite of reinforcing wool fibers disposed within a polymeric matrix.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention describes methods of making polymer/wool composites. Instead of using expensive fibers such as carbon fibers, and relatively expensive ones such as glass fibers, sheep's wool was used as a natural fiber to unexpectedly increase the strength of polymer matrices. The wool reinforcing fibers are often encountered as waste, which is produced in huge quantities, especially in Saudi Arabia during the annual season of Hajj, when pilgrimage and non-pilgrimages are performed by sacrificing sheep and the like. Thus, the present invention is advantageous in not only incorporating less expensive fibers as suitable for reinforcing polymer matrices, but also in providing an avenue for waste disposal.

The prepared polymer/natural wool composites are demonstrated to have excellent mechanical properties. For instance polymer composites based on up to 15 wt % of the wool fibers can raise the strength three-fold as compared to the unreinforced polymers. Polymeric matrices useful in this invention are melt processable thermoplastics, e.g. polystyrene (PS), polyethylene (PE), polypropylene (PP), polyester, polyethylene terephthalate (PET), polycarbonate, acrylonitrile-butadiene-styrene (ABS), thermoplastic elastomers, ethylenepropylenediene (EPDM), polyacrylates, polyvinylchloride (PVC), and polyamide. However thermosets, such as epoxies, vinyl esters, polybenzoxazine, and polyimides may also be used.

Figure 1A:
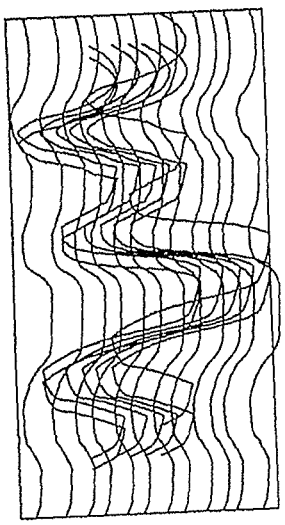
FIGS. 1A-1C illustrate different geometries for incorporation of wool fibers into a polymeric matrix.
Figure 1B:
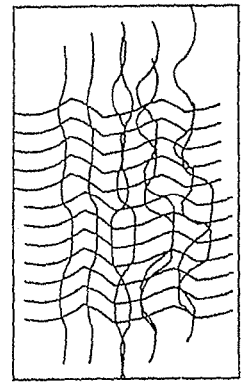
Figure 1C:
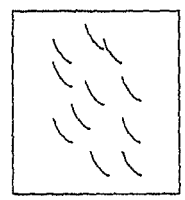

The orientation of wool fibers in the polymer matrices according to the present invention is not particularly limited. For example, FIGS. 1A and 1B illustrate differing geometries for woven, continuous wool fibers disposed in a polymer matrix, and FIG. 1C illustrates a geometry for chopped wool fibers disposed in a polymer matrix.

Figure 2:
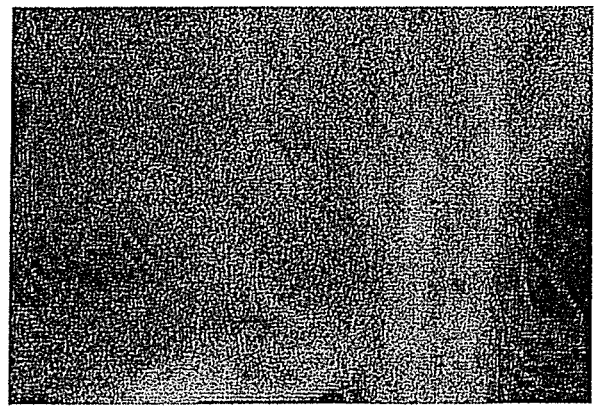
FIG. 2 is a picture of sheep's wool as received.
Figure 3:
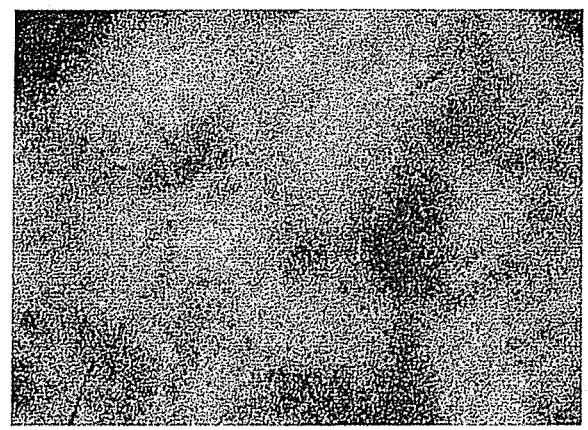
FIG. 3 is a picture of chopped wool fibers.

Sheep's wool fiber as it is received is depicted in FIG. 2, and has a diameter of between about 30 to about 150 micrometers, in lengths from about 30 mm and about 100 mm. Upon receipt, the wool can be used as-is, or chopped into smaller pieces, such as from about 0.1 mm and about 1 mm in length. Advantageously, either the chopped wool fibers or the continuous wool fibers are incorporated into a polymer melt or solution at levels from about 1 wt % to about 15 wt %, or from about 5 wt % to about 15 wt %, or even from about 5 wt % to about 10 wt %, based on the total weight of the polymer/fiber composite, in order to achieve the benefits of the present invention.

Methods of composite preparation include, but are not limited to solution casting, melt blending, solution blending, etc. Those skilled in the art know that thermosetting polymers are not generally melt processable, and therefore when making composites according to the present invention with thermosetting polymers, solution casting or solution blending methods can be used, wherein the thermosetting polymer is dissolved in a suitable solvent prior to blending with the fibers.

Figure 6:
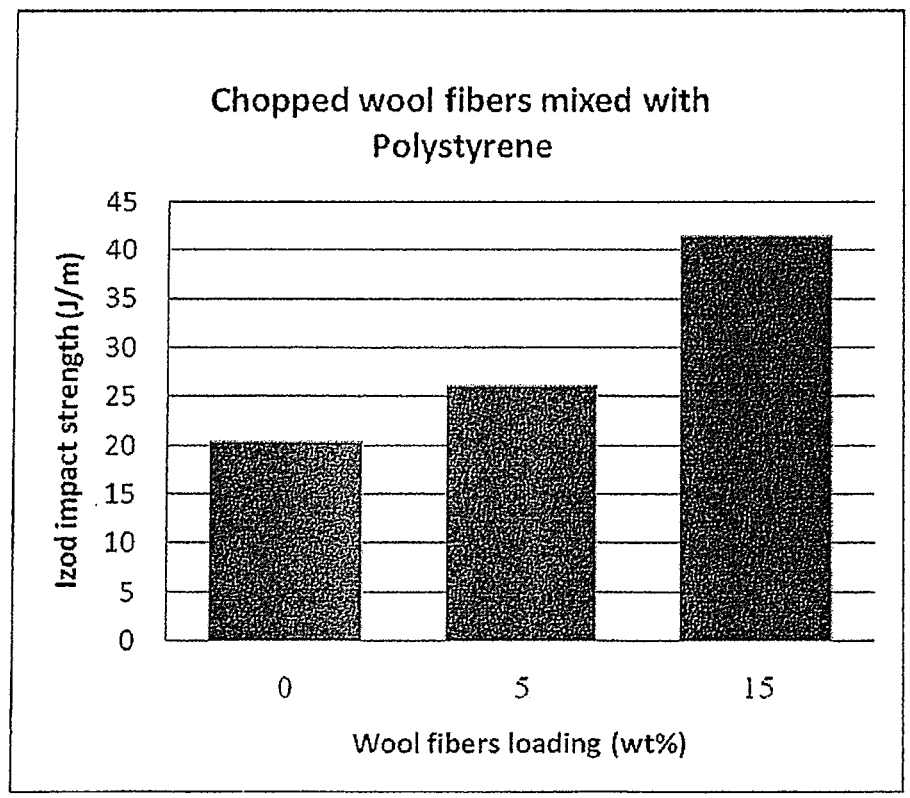
FIG. 6 is a graph illustrating the Izod Impact Strength of chopped wool fiber/polymer blends as compared to fiber loading.

As previously stated, significant increases in various mechanical properties can be achieved according to the present invention. For example, in FIG. 6 it is noted that Izod Impact Strength (ASTM D-256) increases significantly for polymer matrices having chopped wool fibers incorporated therein, as compared to the unblended polymer. According to the data in FIG. 6, unblended polystyrene has an Izod Impact Strength of only about 20 J/m; but a polystyrene matrix having 5 wt % chopped wool fiber loading demonstrates an increase in Izod Impact Strength to greater than about 25 J/m, up to about 26 J/m, and when 15 wt % chopped fibers are blended with the polystyrene, the Izod Impact Strength increases to greater than about 40 J/m, even to about 42 J/m.

Figure 7:
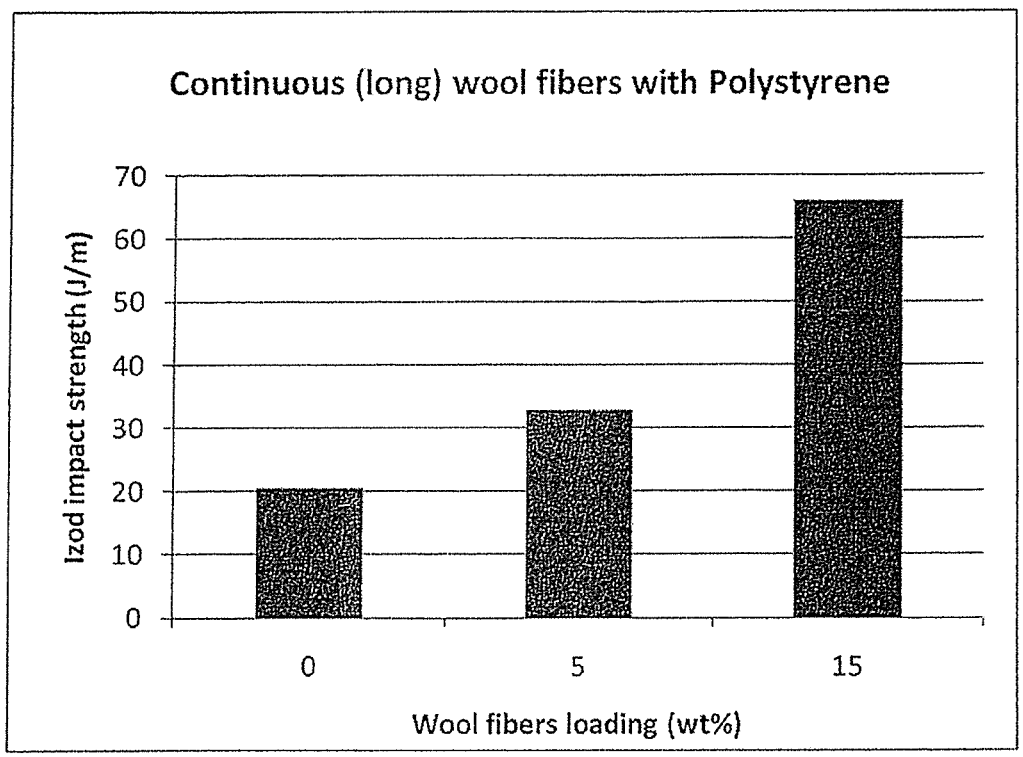
FIG. 7 is a graph illustrating Izod Impact Strength of continuous wool fiber/polymer blends as compared to fiber loading.

FIG. 7 demonstrates even greater increases in Izod Impact Strength for polymer matrices blended with continuous wool fibers, as compared to the unblended polymer. Again, the unblended polystyrene has an Izod Impact Strength of only about 20 J/m; but a polystyrene matrix having 5 wt % continuous wool fiber loading demonstrates an increase in Izod Impact Strength up to about 32 J/m, and when 15 wt % continuous wool fibers are blended with the polystyrene, the Izod Impact Strength increases to about 65 J/m.

Figure 8:
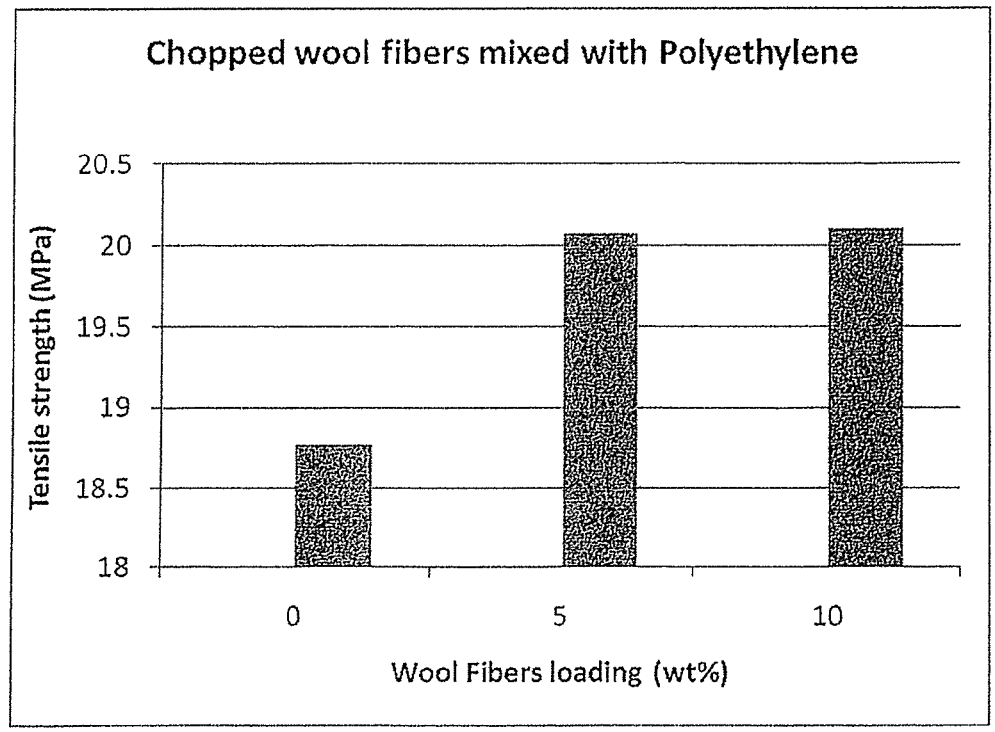
FIG. 8 is a graph illustrating the Tensile Strength of chopped wool fibers/polymer blends as compared to fiber loading.

However, increased Izod Impact Strength is not the only benefit of the present invention. FIG. 8 demonstrates significant increases in Tensile Strength (ASTM D-1708) of polymer matrices blended with a little as 5 wt % chopped wool fibers, as compared to the unblended polymer. Unblended polyethylene demonstrates a Tensile Strength of only about 18.75 MPa, whereas a polyethylene matrix containing as little as 5 wt % chopped wool fiber loading demonstrates an increase in Tensile Strength up to above 20 MPa.

EXAMPLES

The following examples are provided by way of illustration and are not intended to be exhaustive or otherwise limiting to the claimed invention.

Example 1

Figure 4:
FIG. 4 is a picture of a chopped wool fiber/polymer blend.

Wool was chopped into small size fibers (approximately 0.1-1 mm in length) using a grinder with blade cutter suitable for fibrous materials (IKA MF 10 grinder was used). General purpose polystyrene in pellet form was ground into small particles (~0.5 mm). The chopped wool fibers and polystyrene particles were dry mixed and fed to a lab mini extruder for the preparation of polymer/wool molten blends. The extrudates were dried in a vacuum oven overnight and then molded into samples suitable for Izod Impact and Tensile Strength tests according to ASTM D-256 and ASTM D-1708, respectively. FIG. 4 depicts a mixture of chopped fibers in a polymer matrix.

Example 2

The same procedure as in Example 1 was performed, but the polymer used was high density polyethylene (HDPE).

Example 3

Figure 5:
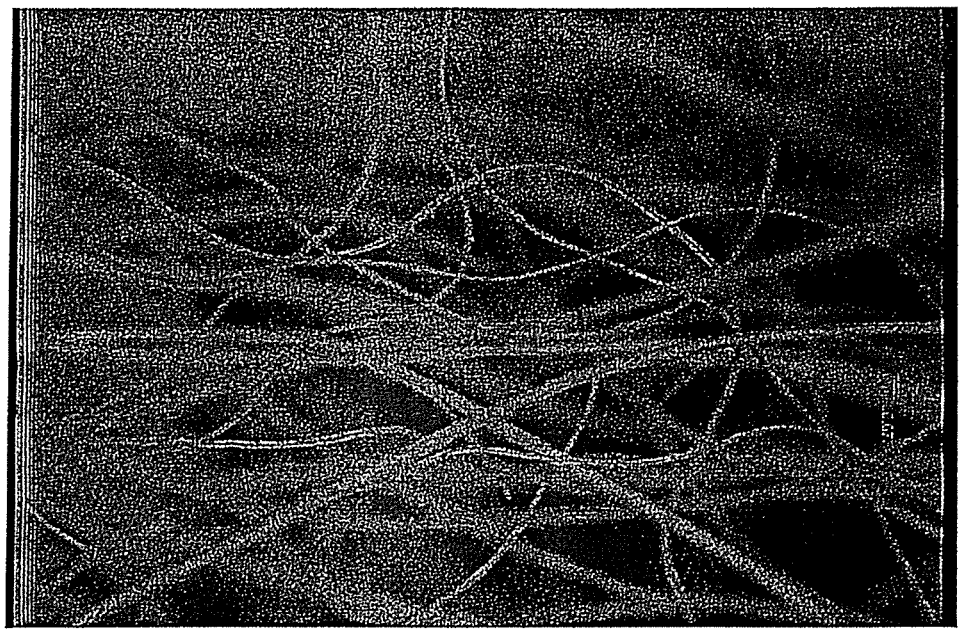
FIG. 5 is a picture of continuous wool fibers in a polymer matrix.

Wool fibers (continuous) and polystyrene powder were put in a mold with dimensions of 100 cm×100 cm×3.5 mm (L×W×D) and melted under compression using a hot press. The resulting sheet was cut into samples for Izod Impact Strength measurements. D was the thickness of the mold. FIG. 5 depicts a blended matrix of polymer and continuous fibers.

Example 4

The same procedure as in Example 3 was conducted, but the polymer used was high density polyethylene (HDPE).

The foregoing examples have been provided for the purpose of explanation and should not be construed as limiting the present invention. While the present invention has been described with reference to an exemplary embodiment. Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A composition comprising wool fibers combined with a polymer to form a reinforced polymeric matrix having at least one of improved Izod Impact Strength (ASTM D-256) or improved Tensile Strength (ASTM D-1708) as compared to the polymer without the fibers, wherein the polymeric matrix is polystyrene and the wool fibers are continuous wool fibers present in an amount of between about 5% and about 15 wt % based on the weight of the composition and dispersed within the polymeric matrix, wherein the wool fibers are woven into a fabric and the fabric is disposed within the polymeric matrix.

2. The composition of claim 1, wherein the wool is sheep's wool.

3. The composition of claim 1, wherein the wool fibers have diameters from about 30 to about 150 microns.

4. The composition of claim 3, wherein the wool fibers are lengths of from about 0.1 mm and 1.0 mm.

5. The composition of claim 3, wherein the wool fibers have lengths of at least about 30 mm.

6. The composition of claim 1, having a tensile strength greater than about 20 MPa.

7. The composition of claim 1, having an Izod Impact Strength greater than about 25 J/m.

8. An article of manufacture, comprising a reinforced polymer composite of reinforcing wool fibers disposed within a polymeric matrix as recited in claim 1.

* * * * *